Jan. 21, 1969   L. J. BROOKS ETAL   3,422,624
GAS TURBINE ENGINE
Filed Jan. 23, 1967
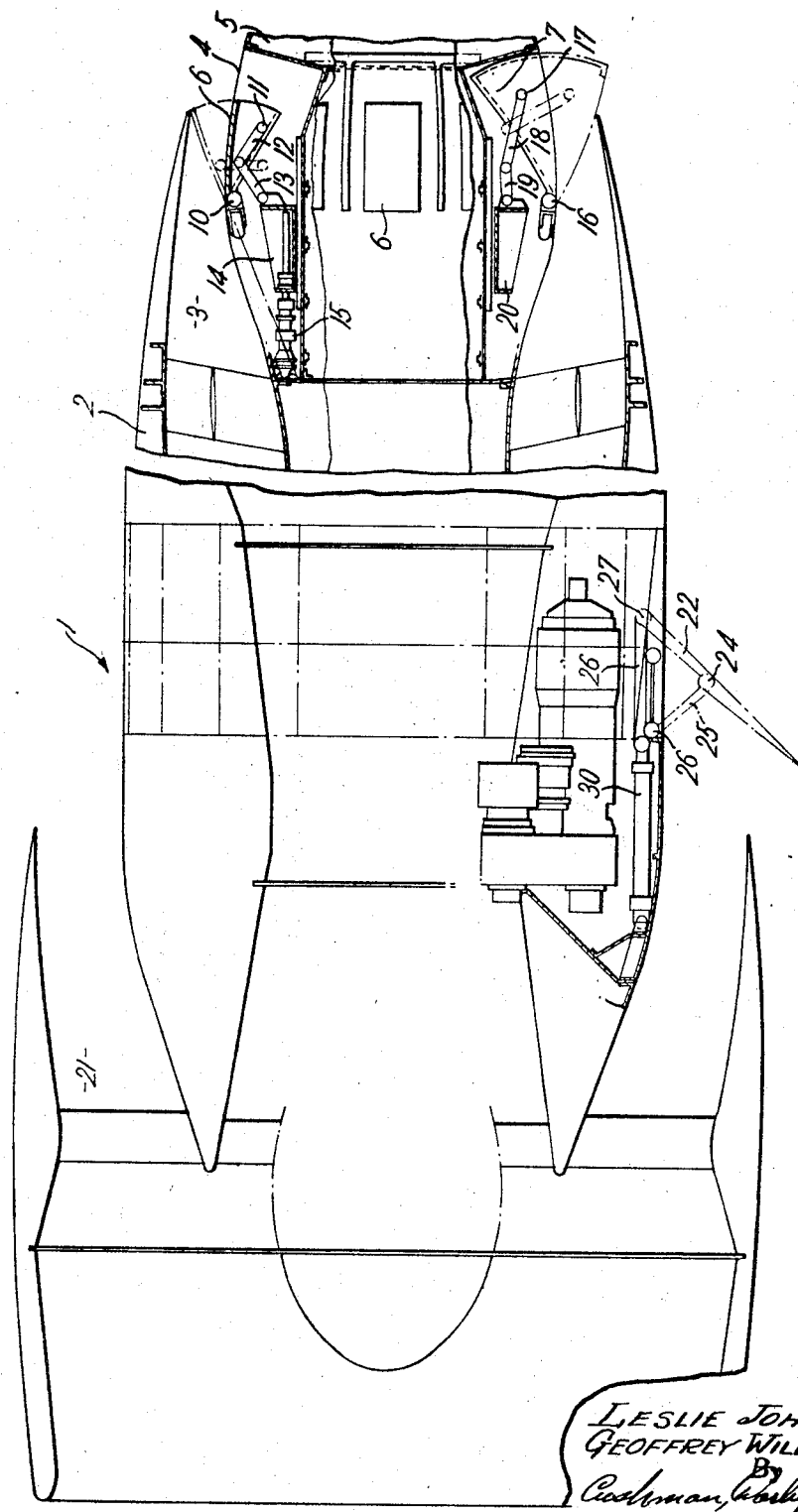
Inventors
LESLIE JOHN BROOKS
GEOFFREY WILLIAM MORRIS
By
Cushman, Darby & Cushman
Attorneys

United States Patent Office 3,422,624
Patented Jan. 21, 1969

3,422,624
GAS TURBINE ENGINE
Leslie John Brooks, Hamble, Hants, and Geoffrey William Morris, Breaston, England, assignors to Rolls-Royce Limited, Derby, England, a British company
Filed Jan. 23, 1967, Ser. No. 610,885
Claims priority, application Great Britain, Feb. 14, 1966, 6,461/66
U.S. Cl. 60—226       5 Claims
Int. Cl. F02k *1/20, 3/02;* B64d *33/04*

ABSTRACT OF THE DISCLOSURE

A gas turbine engine has an exhaust duct whose internal wall is provided both with thrust reverser flaps and with silencing flaps which alternate with each other. In their operative position, the silencing flaps occlude parts of the exhaust duct, although the turbine exhaust gases may flow between.

---

This invention concerns a gas turbine engine.

According to the present invention, there is provided a gas turbine engine having a exhaust duct, a plurality of angularly spaced apart silencing flaps which are carried by the exhaust duct and which are movable between an inoperative position, in which they permit unimpeded flow of the turbine exhaust gases through the exhaust duct, and an operative position in which they occlude angularly spaced apart portions only of the exhaust duct but in which the turbine exhaust gases may flow downstream between them, and interposed between the silencing flaps and alternating therewith, a plurality of angularly spaced apart thrust reverser flaps which are movable between an inoperative position, in which they leave the flow of the turbine exhaust gases undeflected, and an operative position in which they effect thrust reversal of angularly spaced apart portions of the exhaust gas stream without deflecting other portions thereof.

All the said flaps may form a part of the internal wall of the exhaust duct.

The arrangement may be such that the thrust reverser or spoiler flaps can be moved into the operative position only when the silencing flaps are in the inoperative position.

In another aspect, the invention provides a gas turbine engine having an exhaust duct, a thrust reverser which is carried by the exhaust duct and which is movable into an out of an operative position, and a plurality of angularly spaced apart silencing flaps which are carried by the exhaust duct and which are movable between an inoperative position, in which they permit unimpeded flow of the turbine exhaust gases through the exhaust duct, and an operative position in which they occlude angularly spaced apart portions only of the exhaust duct but in which the turbine exhaust gases may flow downstream between them, the engine having a fan duct in which is mounted an engine-driven fan, the fan duct being provided with a thrust reverser which is movable into and out of an operative position.

The fan may be driven by a compressor of the engine.

Power means may be provided for effecting simultaneous operation of both thrust reversers or spoilers.

In yet another aspect, the invention provides a gas turbine engine having an exhaust duct, a thrust reverser which is carried by the exhaust duct and which is movable into and out of an operative position, and a plurality of angularly spaced apart silencing flaps which are carried by the exhaust duct and which are movable between an inoperative position, in which they permit unimpeded flow of the turbine exhaust gases through the exhaust duct, and an operative position in which they occlude angularly spaced apart portions only of the exhaust duct but in which the turbine exhaust gases may flow downstream between them, the engine having two concentric shafts the outer of which carries a high pressure compressor and a high pressure turbine of the engine, and the inner of which carries a low pressure compressor and a low pressure turbine of the engine.

The invention is illustrated, merely by way of example, in the accompanying drawing which is a diagrammatic view, partly in section, of a gas turbine engine according to the present invention.

Referring to the drawing, a gas turbine by-pass engine 1 has an engine casing 2 within which is mounted in flow series a low pressure compressor, a high pressure compressor, combustion equipment to which fuel is supplied by way of a fuel system, a high pressure turbine, and a low pressure turbine. In order to simplify the drawing, none of these parts are shown therein.

The turbine exhaust gases are directed to atmosphere through an exhaust duct 3 having an inner wall 4 which is constituted by the wall of a nose cone 5. The inner wall 4 is provided with a plurality of angularly spaced apart rectangular silencing flaps 6 which alternate with a plurality of angularly spaced apart thrust reverser flaps 7.

Each of the silencing flaps 6 is mounted on a pivot 10 disposed adjacent to the upstream edge of the flap. Each of the silencing flaps 6 has a pivot 11 to which is connected one end of a link 12 whose other end is pivotally connected to a link 13, the link 13 being connected to a slide 14 movable by a ram or rams 15. The silencing flaps 6 are thus movable by the ram or rams 15 between an inoperative position, shown in full lines, in which the silencing flaps 6 do not impede the flow of turbine exhaust gases through the exhaust duct 3, and an operative position, shown in chain dotted lines, in which they occlude angularly spaced apart portions only of the exhaust duct 3 but in which the turbine exhaust gases may flow downstream between them.

Each of the thrust reverser flaps 7 is mounted on a pivot 16 at its upstream edge and is provided with a pivot 17 to which is connected one end of a link 18 whose other end is pivotally connected to a link 19, the link 19 being itself pivotally connected to a slide 20. A ram or rams (not shown) is provided to effect sliding movement of the slide 20 so as to move the thrust reverser flaps 7 between an inoperative position, in which they do not deflect the flow of turbine exhaust gases, and an operative position in which they effect thrust reversal of angularly spaced apart portions of the exhaust gas stream without deflecting other portions thereof.

Means (not shown) are provided to ensure that the thrust reverser flaps 7 can be moved into the operative position only when the silencing flaps 6 are in the inoperative position.

The engine 1 is a front fan engine having a fan duct 21 in which is mounted a fan (not shown) driven by the low pressure compressor. The engine casing 2, which forms the inner wall of the fan duct 21, is provided with thrust reverser flaps 22. Each of the thrust reverser flaps 22 is pivoted at 24, approximately midway of its length, to one end of a link 25 whose other end 26 is pivotally mounted in the engine casing 2. The downstream end 27 of the thrust reverser flap 22 is pivotally connected to one end of a link 28 whose other end is pivoted to a ram 30. The ram 30 may thus be operated to move the respective thrust reverser flap 22 between an inoperative position, in which it does not deflect the stream of air passing through the fan duct 21, and an operative position in which it effects thrust reversal of angularly spaced apart portions of this air stream without deflecting other portions thereof. The rams operating the thrust reverser flaps 7, 22 may be interconnected (by means not shown) so that these flaps may be simultaneously moved between the inoperative and operative positions.

In operation, when the pilot of an aircraft provided with the engine 1 is approaching an airport, he throttles back the engine and moves the silencing flaps 6 into the operative position in which they occlude angularly spaced apart portions only of the exhaust duct 3. As a result, some of the noise produced by the turbines of the engine is reflected back upstream. Moreover, the silencing flaps 6, when in the operative position, form the exhaust duct 3 into a "corrugated nozzle" having a large boundary area in which the turbine exhaust gases mix with the ambient air. This further increases the silencing effect.

The silencing flaps 6, when in the operative position, also reduce the effective area through which the turbine exhaust gases can flow. A back pressure is therefore produced which slows down the low pressure turbine and hence the low pressure compressor and the fan. The slowing down of the low pressure compressor and the fan, however, reduces the noise created by these parts.

At the same time the fuel flow provided by the said fuel system will be increased with the result that the thrust lost by the occlusion of parts of the exhaust duct 3 by the silencing flaps 6 will be made up.

After the aircraft has touched down, the silencing flaps 6 are retracted and the thrust reverser flaps 7, 22 are moved into their operative positions.

It will thus be appreciated that the construction shown in the drawing will substantially reduce the noise at landing of high speed aircraft.

We claim:

1. A gas turbine engine comprising: an exhaust duct; a plurality of angularly spaced apart silencing flaps carried by the exhaust duct and movable between an inoperative position, in which they permit unimpeded flow of the turbine exhaust gases through the exhaust duct, and an operative position in which they occlude angularly spaced apart portions only of the exhaust duct but in which the turbine exhaust gases may flow downstream between them; and a plurality of angularly spaced apart thrust reverser flaps interposed between and alternating with said silencing flaps, said thrust reverser flaps being movable between an inoperative position, in which they leave the flow of the turbine exhaust gases undeflected, and an operative position in which they effect thrust reversal of angularly spaced apart portions of the exhaust gas stream without deflecting other portions thereof.

2. A gas turbine engine as claimed in claim 1 in which all of said silencing and thrust reverser flaps form part of the internal wall of the exhaust duct.

3. A gas turbine engine as claimed in claim 1 in which the thrust reverser flaps can be moved into the operative position only when the silencing flaps are in the inoperative position.

4. A gas turbine engine comprising: an exhaust duct; a thrust reverser carried by the exhaust duct and movable into and out of an operative position; a plurality of angularly spaced apart silencing flaps carried by the exhaust duct and movable between an inoperative position, in which they permit unimpeded flow of the turbine exhaust gases through the exhaust duct, and an operative position in which they occlude angularly spaced apart portions only of the exhaust duct but in which the turbine exhaust gases may flow downstream between them; a fan duct; an engine-driven fan mounted in said fan duct; and a thrust reverser provided for said fan duct and movable into and out of an operative position.

5. A gas turbine engine as claimed in claim 4 in which power means are provided for effecting simultaneous operation of both thrust reversers.

References Cited

UNITED STATES PATENTS

| | | | |
|---|---|---|---|
| 2,938,335 | 5/1960 | Cook | 181—33.222 |
| 3,032,981 | 5/1962 | Lawlor | 181—33.222 |
| 3,280,561 | 10/1966 | Kutney | 60—226 |

JULIUS E. WEST, *Primary Examiner.*

DOUGLAS HART, *Assistant Examiner.*

U.S. Cl. X.R.

60—230; 239—265.13, 265.29, 265.39; 181—33